US008761663B2

(12) United States Patent
Kaplan et al.

(10) Patent No.: US 8,761,663 B2
(45) Date of Patent: Jun. 24, 2014

(54) ANTENNA SYSTEM

(75) Inventors: Ilan Kaplan, North Bethesda, MD (US); David Gross, Saddle River, NJ (US); Daniel Francis DiFonzo, Vienna, VA (US); Kevin Arthur Bruestle, Falls Church, VA (US); Victor Boyanov, Sofia (BG); Stanimir Dimitrov Kamenopolski, Sofia (BG)

(73) Assignee: Gilat Satellite Networks, Ltd, Petah Tikva (IL)

( * ) Notice: Subject to any disclaimer, the term of this patent is extended or adjusted under 35 U.S.C. 154(b) by 457 days.

(21) Appl. No.: 13/048,550

(22) Filed: Mar. 15, 2011

(65) Prior Publication Data

US 2011/0217976 A1 Sep. 8, 2011

Related U.S. Application Data

(63) Continuation-in-part of application No. 13/030,866, filed on Feb. 18, 2011, now abandoned, which is a continuation of application No. 11/647,576, filed on Dec. 29, 2006, now Pat. No. 7,911,400, which is a continuation-in-part of application No. 11/320,805, filed on Dec. 30, 2005, now Pat. No. 7,705,793, and a continuation-in-part of application No. 11/074,754, filed on Mar. 9, 2005, now abandoned, and a continuation-in-part of application No. 11/071,440, filed on Mar. 4, 2005, now abandoned, and a continuation-in-part of application No. 10/498,668, filed on Jun. 10, 2004, now Pat. No. 6,995,712, and a continuation-in-part of application No. 10/925,937, filed on Aug. 26, 2004, now Pat. No. 7,379,707, said application No. 11/647,576 is a continuation-in-part of application No. 10/752,088, filed on Jan. 7, 2004, now Pat. No. 6,999,036, and a continuation-in-part of application No. 11/374,049, filed on Mar. 14, 2006, now abandoned, and a continuation-in-part of application No. 11/183,007, filed on Jul. 18, 2005, now Pat. No. 7,385,562.

(60) Provisional application No. 60/650,122, filed on Feb. 7, 2005, provisional application No. 61/314,066, filed on Mar. 15, 2010.

(51) Int. Cl.
*H04B 7/185* (2006.01)

(52) U.S. Cl.
USPC ..... 455/12.1; 455/550.1; 455/3.01; 455/3.02; 455/3.03; 455/3.04; 343/878; 343/879; 343/880; 343/881; 343/882; 342/74; 342/75; 342/76; 342/77; 342/78

(58) Field of Classification Search
USPC ......... 455/550.1, 3.01, 3.02, 3.05, 3.06, 11.1, 455/12.1, 13.3; 342/74–81, 350, 352, 354, 342/357.2–357.25, 358, 359, 367–368; 343/878–882, 824, 826, 835, 844, 893
See application file for complete search history.

(56) References Cited

U.S. PATENT DOCUMENTS

| | | | |
|---|---|---|---|
| 3,565,650 | A | 2/1971 | Cordon |
| 4,101,335 | A | 7/1978 | Barrable et al. |

(Continued)

FOREIGN PATENT DOCUMENTS

| | | |
|---|---|---|
| EP | 0572933 | 12/1993 |
| EP | 0810685 A2 | 12/1997 |

(Continued)

OTHER PUBLICATIONS

RaySat Inc.: Press release, Online, Jan 6, 2005, retrieved from the Internet: http://www.raysat.us/news/release/01-16-05-internet.asp.

(Continued)

*Primary Examiner* — Fayyaz Alam
(74) *Attorney, Agent, or Firm* — Banner & Witcoff, Ltd.

(57) ABSTRACT

A multi-band low-profile, low-volume two-way mobile panel array antenna system is described. Operation of the antenna may automatically switch between bands based on various user-entered parameters.

19 Claims, 10 Drawing Sheets

(56) References Cited

U.S. PATENT DOCUMENTS

| | | | | |
|---|---|---|---|---|
| 4,771,293 | A | 9/1988 | Williams | |
| 4,811,026 | A | 3/1989 | Bissett | |
| 4,903,033 | A | 2/1990 | Tsao et al. | |
| 5,005,019 | A | 4/1991 | Zaghloul et al. | |
| 5,038,152 | A | 8/1991 | Wong | |
| 5,043,738 | A | 8/1991 | Shapiro et al. | |
| 5,076,986 | A | 12/1991 | Delvaux et al. | |
| 5,207,830 | A | 5/1993 | Cowan et al. | |
| 5,245,348 | A | 9/1993 | Kunitoshi | |
| 5,303,393 | A | 4/1994 | Noreen et al. | |
| 5,379,320 | A | 1/1995 | Fernandes et al. | |
| 5,408,241 | A | 4/1995 | Shattuck et al. | |
| 5,528,250 | A | 6/1996 | Sherwood et al. | |
| 5,706,015 | A | 1/1998 | Chen et al. | |
| 5,725,652 | A | 3/1998 | Shulman | |
| 5,835,057 | A | 11/1998 | van Heyningen | |
| 5,929,819 | A | 7/1999 | Grinberg | |
| 5,956,372 | A | 9/1999 | Vaman et al. | |
| 6,018,320 | A | 1/2000 | Jidhage et al. | |
| 6,023,244 | A | 2/2000 | Snygg et al. | |
| 6,043,788 | A | 3/2000 | Seavey | |
| 6,111,542 | A | 8/2000 | Day et al. | |
| 6,124,832 | A | 9/2000 | Ik et al. | |
| 6,134,423 | A | 10/2000 | Wiedeman et al. | |
| 6,157,817 | A | 12/2000 | Norin et al. | |
| 6,191,734 | B1 | 2/2001 | Park | |
| 6,191,744 | B1 | 2/2001 | Snow et al. | |
| 6,218,999 | B1 | 4/2001 | Bousquet et al. | |
| 6,311,128 | B1 | 10/2001 | Prum et al. | |
| 6,317,096 | B1 | 11/2001 | Daginnus et al. | |
| 6,377,211 | B1 | 4/2002 | Hsiung | |
| 6,407,714 | B1 | 6/2002 | Butler et al. | |
| 6,483,472 | B2 | 11/2002 | Cipolla et al. | |
| 6,486,845 | B2 | 11/2002 | Ogawa et al. | |
| 6,496,158 | B1 | 12/2002 | Ksienski et al. | |
| 6,636,721 | B2 | 10/2003 | Threadgill et al. | |
| 6,639,548 | B2 | 10/2003 | Courtney et al. | |
| 6,678,520 | B1 | 1/2004 | Wang | |
| 6,695,398 | B2 | 2/2004 | Racine et al. | |
| 6,707,432 | B2 | 3/2004 | Strickland | |
| 6,710,749 | B2 | 3/2004 | King | |
| 6,807,222 | B1 | 10/2004 | Widdowson | |
| 6,839,039 | B2 | 1/2005 | Tanaka et al. | |
| 6,873,256 | B2 | 3/2005 | Lemelson et al. | |
| 6,882,321 | B2 | 4/2005 | Tietjen | |
| 6,900,769 | B2 | 5/2005 | Schlieber et al. | |
| 6,922,145 | B2 | 7/2005 | Piesinger | |
| 6,927,736 | B1 | 8/2005 | Kornbau et al. | |
| 6,957,702 | B2 | 10/2005 | Brothers et al. | |
| 6,965,343 | B1 | 11/2005 | Dybdal et al. | |
| 6,987,489 | B2 | 1/2006 | Melconian et al. | |
| 6,999,036 | B2 | 2/2006 | Stoyanov et al. | |
| 7,183,996 | B2 | 2/2007 | Wensink | |
| 7,227,508 | B2 | 6/2007 | Wang et al. | |
| 7,339,520 | B2 | 3/2008 | Chang et al. | |
| 7,492,322 | B2 | 2/2009 | Jung et al. | |
| 7,532,694 | B2 | 5/2009 | Hwang et al. | |
| 7,629,935 | B2 * | 12/2009 | Mansour et al. | 343/757 |
| 7,760,153 | B2 | 7/2010 | Bulow | |
| 2001/0027146 | A1 | 10/2001 | Spaziani et al. | |
| 2002/0041328 | A1 | 4/2002 | LeCompte et al. | |
| 2002/0132578 | A1 | 9/2002 | Wiedeman | |
| 2002/0167449 | A1 | 11/2002 | Frazita et al. | |
| 2003/0060156 | A1 | 3/2003 | Giaccherini et al. | |
| 2003/0090416 | A1 | 5/2003 | Howell et al. | |
| 2003/0097658 | A1 | 5/2003 | Richards | |
| 2003/0181161 | A1 | 9/2003 | Harles et al. | |
| 2003/0214449 | A1 | 11/2003 | King | |
| 2003/0222778 | A1 | 12/2003 | Piesinger | |
| 2004/0087294 | A1 | 5/2004 | Wang | |
| 2004/0090352 | A1 | 5/2004 | Jaffe et al. | |
| 2004/0092228 | A1 | 5/2004 | Force et al. | |
| 2005/0113040 | A1 | 5/2005 | Walker et al. | |
| 2005/0126430 | A1 | 6/2005 | Lightner et al. | |
| 2005/0229235 | A1 | 10/2005 | Loyer | |
| 2006/0176227 | A1 | 8/2006 | Fujii et al. | |
| 2006/0197713 | A1 * | 9/2006 | Mansour et al. | 343/882 |
| 2006/0244669 | A1 | 11/2006 | Mansour et al. | |
| 2006/0250285 | A1 | 11/2006 | Jaffe et al. | |
| 2006/0268738 | A1 | 11/2006 | Goerke et al. | |
| 2007/0027624 | A1 | 2/2007 | Powe et al. | |
| 2007/0252765 | A1 | 11/2007 | Jayasuriya et al. | |
| 2008/0018545 | A1 | 1/2008 | Kaplan | |
| 2009/0027260 | A1 * | 1/2009 | Runyon et al. | 342/352 |
| 2011/0050487 | A1 * | 3/2011 | Melconian et al. | 342/352 |
| 2013/0135163 | A1 * | 5/2013 | Desclos et al. | 343/745 |

FOREIGN PATENT DOCUMENTS

| | | | |
|---|---|---|---|
| EP | 0985646 | | 3/2000 |
| WO | 9931757 | | 6/1999 |
| WO | 0111718 | A | 2/2001 |
| WO | 02097919 | A | 12/2002 |
| WO | 2004075339 | A | 9/2004 |
| WO | 2006004813 | | 1/2006 |

OTHER PUBLICATIONS

EP 06127356.1 extended Search Report dated Nov. 1, 2007.
U.S. Appl. No. 13/030,866; NFOA mail date Sep. 19, 2011.

* cited by examiner

ANTENNA SYSTEM

CROSS-REFERENCE TO RELATED APPLICATIONS

The present application is a continuation-in-part of copending U.S. application Ser. No. 13/030,866, filed Feb. 18, 2011, entitled "Applications for Low Profile Two-Way Satellite Antenna System, which is a continuation of U.S. application Ser. No. 11/647,576 (the '576 Application), filed Dec. 29, 2006, which is a continuation-in-part of U.S. application Ser. No. 11/320,805 (the '805 Application), filed Dec. 30, 2005, and which claims priority under 35 U.S.C. §119(e)(1) to U.S. Provisional Application No. 60/650,122, filed Feb. 7, 2005; the '805 Application also claims priority under 35 U.S.C. §120 as a continuation-in-part to U.S. application Ser. No. 11/074,754, filed Mar. 9, 2005, U.S. application Ser. No. 11/071,440, filed Mar. 4, 2005, U.S. application Ser. No. 10/498,668, filed Dec. 17, 2002, and U.S. Application Ser. No. 10/925,937, filed Aug. 26, 2004; the '576 Application is also a continuation-in-part of U.S. application Ser. No. 10/752,088, filed Jan. 7, 2004, U.S. application Ser. No. 11/374,049, filed Mar. 14, 2006, and U.S. application Ser. No. 11/183,007, filed Jul. 18, 2005. The contents of the above cases are hereby incorporated by reference as nonlimiting examples of one or more features described herein. The present application also claims priority to U.S. Provisional Application No. 61/314,066, entitled "Antenna System" and filed on Mar. 15, 2010, the contents of which are hereby incorporated by reference as a non-limiting example of the system described herein.

FIELD OF ART

The features described herein relate generally to wireless communications, such as satellite communications.

BACKGROUND

Demand for telecommunication services is constantly increasing, as more and more users seek more and more convenience in accessing information. Cellular telephones and smartphones have allowed users to remain in contact with wired networks from distant locations. Mobile satellite receivers are also in use to provide similar connectivity via satellite. Different communication networks often require different transmission and reception equipment, and there remains an ever-present need for users to maximize the flexibility of the equipment that they use.

SUMMARY

The present application relates generally to offering an antenna system that can be configured to automatically switch between disparate types of wireless network communications.

In some embodiments, an antenna system may include a flat panel array mounted on a rotatable assembly, with control circuitry and motors to track satellites using one or more frequency bands. The system may be configured to automatically switch between the various bands based on user-defined parameters.

The various user defined parameters may include signal strength, geographic position, satellite look angle, bandwidth, time of day, cost of network, application or data type, etc.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
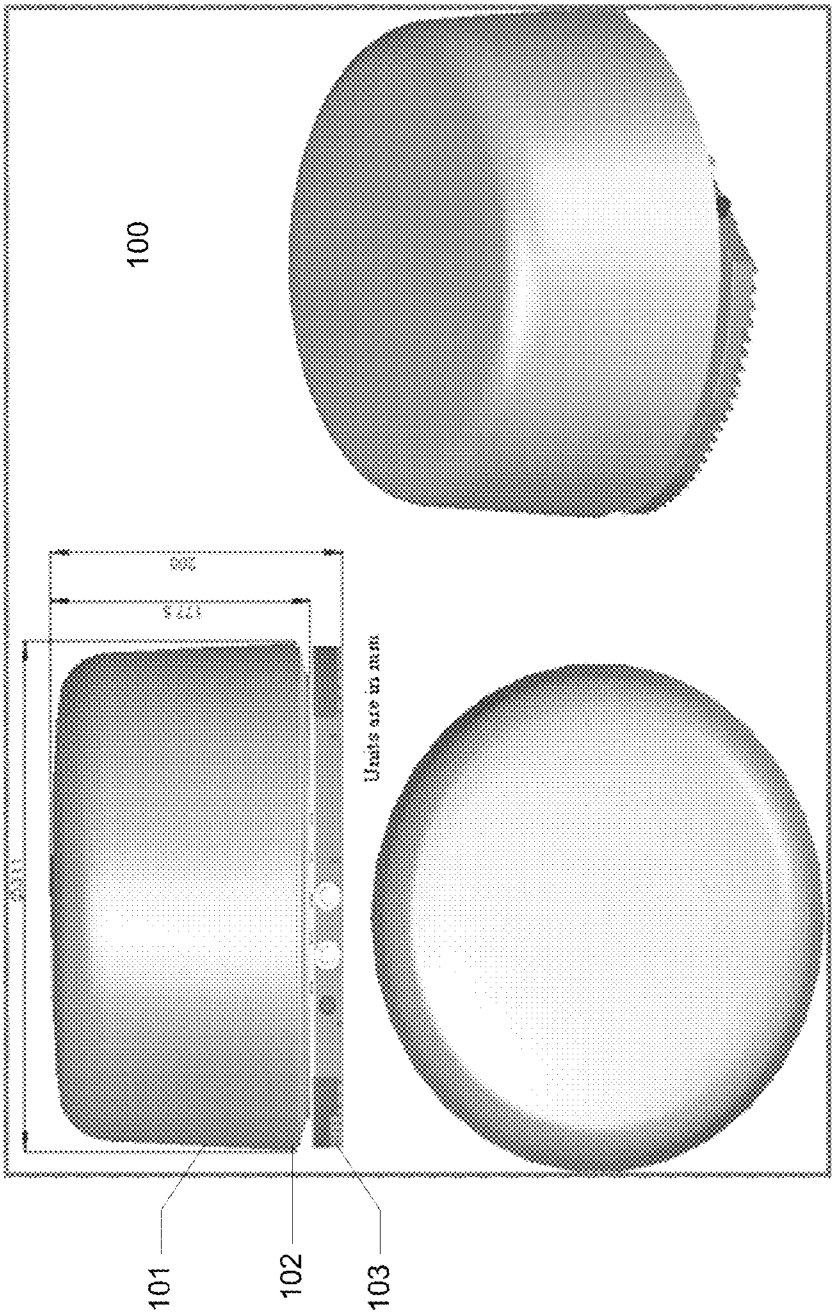
FIG. 1 illustrates an example radome-covered antenna assembly.

FIG. 1 illustrates an example physical configuration of a low-profile, low volume, switchable band antenna assembly suitable for two-way use for portable satellite communications on-the-move (e.g., mounted on a moving vehicle). Such an antenna can support various data rates, such as 64 kbps transmit and 2 Mbps receive.

The antenna assembly 100 may include a radome cover enclosure 101 that houses various antenna components described herein. The cover 101 may be formed using a weatherproof material that passes electromagnetic frequencies in the desired bands of operation, and can serve as a protective housing for the antenna assembly 100. Example components housed within the cover 101 are discussed further below with respect to FIGS. 2*a*-3*b*. For example, the enclosure 101 can have a generally cylindrical shape, and be shorter than thirteen inches in diameter (e.g., it can have a twelve-inch or 311 mm diameter) and ten inches in height (e.g., it can have an eight-inch or 200 mm height).

The cover 101 and the components housed within may be mounted on a rotating platform assembly 102. The rotating assembly 102 may be motor driven to rotate about a vertical axis to adjust the azimuth of the assembly to track one or more signal sources, such as satellites. Example components of the assembly 102 are discussed further below with respect to FIG. 4.

The rotating assembly 102 may be mounted onto a block upconverter (BUC) 103. The BUC 103 may include frequency upconversion circuitry to convert signals from one frequency to a higher frequency for transmission. Example features of the BUC 103 are discussed further below with respect to FIG. 5.

Figure 2A:
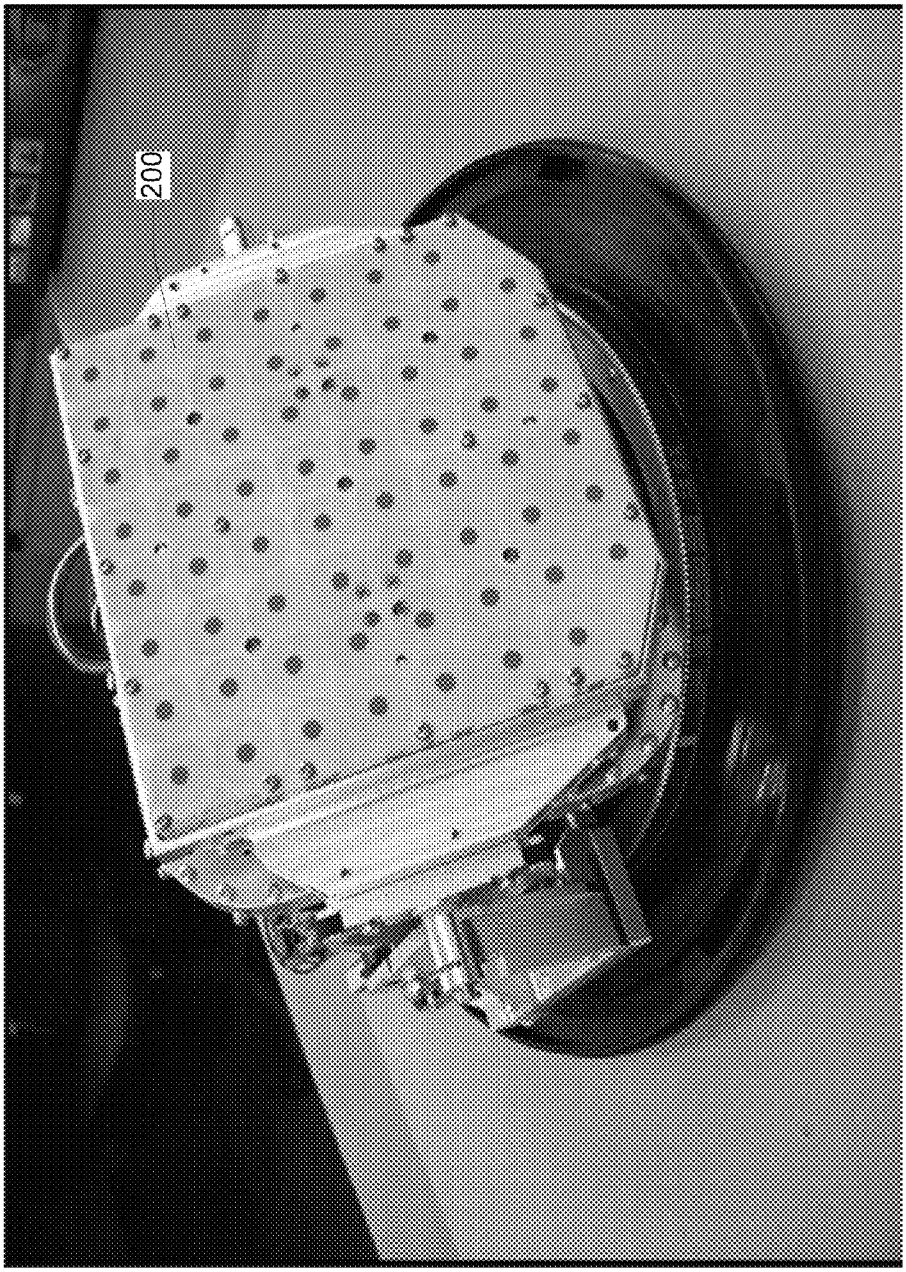
FIGS. 2*a* & *b* illustrate the FIG. 1 example, with the radome removed.
Figure 2B:
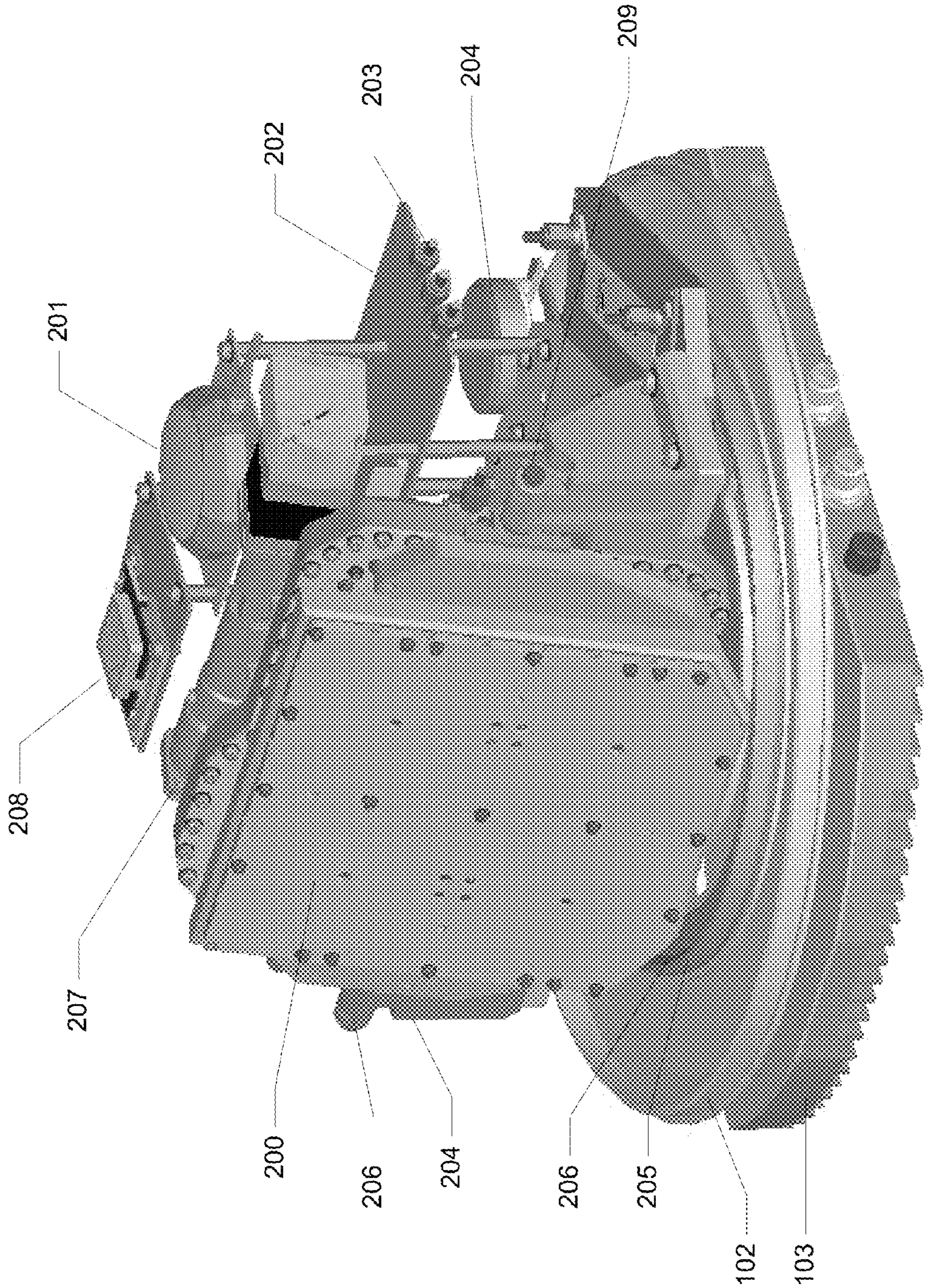

FIGS. 2*a* & *b* illustrate an example of the assembly 100 with the cover 101 removed. As depicted, the antenna may include one or more flat panel arrays 200. The array 200 can include a series of antenna transmission and reception elements, such as a printed circuit design with parasitic patches to extend the frequency response and provide wide band capability. The panel configuration allows it to maintain a flat profile with low volume, which can be advantageous for mounting on the exterior of vehicles.

The panel array 200 may be a bidirectional Ku-band array panel configured to communicate with satellites in the Ku-band (e.g., 14.0 to 14.5 GHz and 10.9 to 12.7 GHz), a Ka-band panel configured to communicate with satellites in the Ka-band (e.g., 26.5 to 40 GHz), or any other desired panel for a desired frequency band. In some embodiments, the array 200 is configured for a high frequency transmission such as the Ku and Ka bands discussed above. High frequency bands may be those above 2 GHz.

In addition to the high-frequency panel, the antenna assembly 100 may include one or more low frequency antennas 201. The low-frequency antenna 201 may be, for example, an L-band panel configured to communicate with satellites in the L-band (e.g, IMMARSAT 1525 to 1646.5 MHz). The assembly 100 or antenna panel 200 may also include antennas for communicating with terrestrial networks, such as wireless cellular telephone networks, WiMax wireless computer networks, and the like.

The operation of the antenna 100 may be controlled by a controller circuit 202, which can include one or more microprocessors and one or more memories (e.g., flash memories, ROMs, removable media, etc.) storing computer-executable instructions that, when executed by the one or more microprocessors, cause the antenna assembly 100 and its components to perform in the various manners described herein. The controller circuit 202 may include one or more external interfaces, such as audio/visual interfaces (displays, speakers, touch screens, etc.), computer monitor interfaces, user input device interfaces (e.g., keyboards, mice, touch screens, etc.). The interfaces may also include interfaces for external control, such as an Ethernet interface, Universal Serial Bus (USB), a serial interface, or any other desired device interface. The circuit 202 may also include a series of coaxial cable interfaces 203, which can be connected to a modem device to transmit and receive signals for a customer device. For example, the antenna may be connected to one or more satellite modems, which can convert the antenna's signals into a desired digital interface, such as an Internet Protocol interface. User devices can connect to the IP interface, and can use the modem to send and receive data with other devices on the Internet.

The controller circuit 202 can also cause the assembly to rotate to adjust azimuth, and elevate the panel 200 to adjust elevation by tilting the panel about an elevation mount 209, to allow the panel 200 to track one or more satellites. To do so, the assembly may include one or more motors 204 (e.g., motors 204 can include azimuth and elevation motors), belts 205, pulleys 206, etc.

The antenna assembly 100 can also include a polarization circuit 207, which can be configured to adjust the polarization of signals for transmission and/or reception. The assembly 100 can also include a global positioning system (GPS) 208, which can be configured to receive satellite timing signals and triangulate the position of the assembly 100. This circuit can further include internal 3-axis gyroscopes and corresponding orientation circuitry to detect acceleration of the assembly 100 as it moves and turns, as well as 2-axis inclinometers.

Figure 3A:
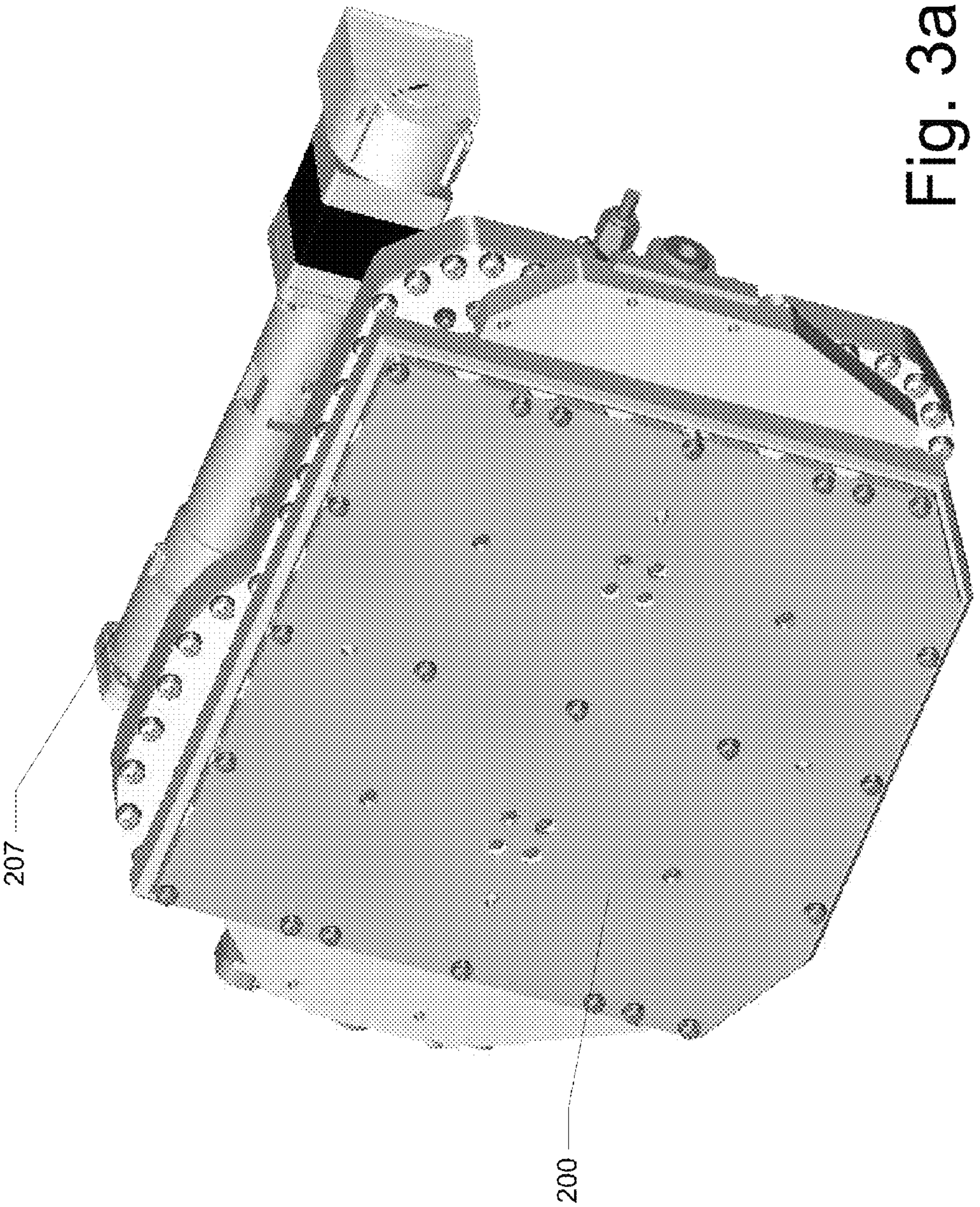
FIGS. 3*a* & *b* illustrate closer views of a flat panel array shown in FIGS. 2*a* & *b*.
Figure 3B:
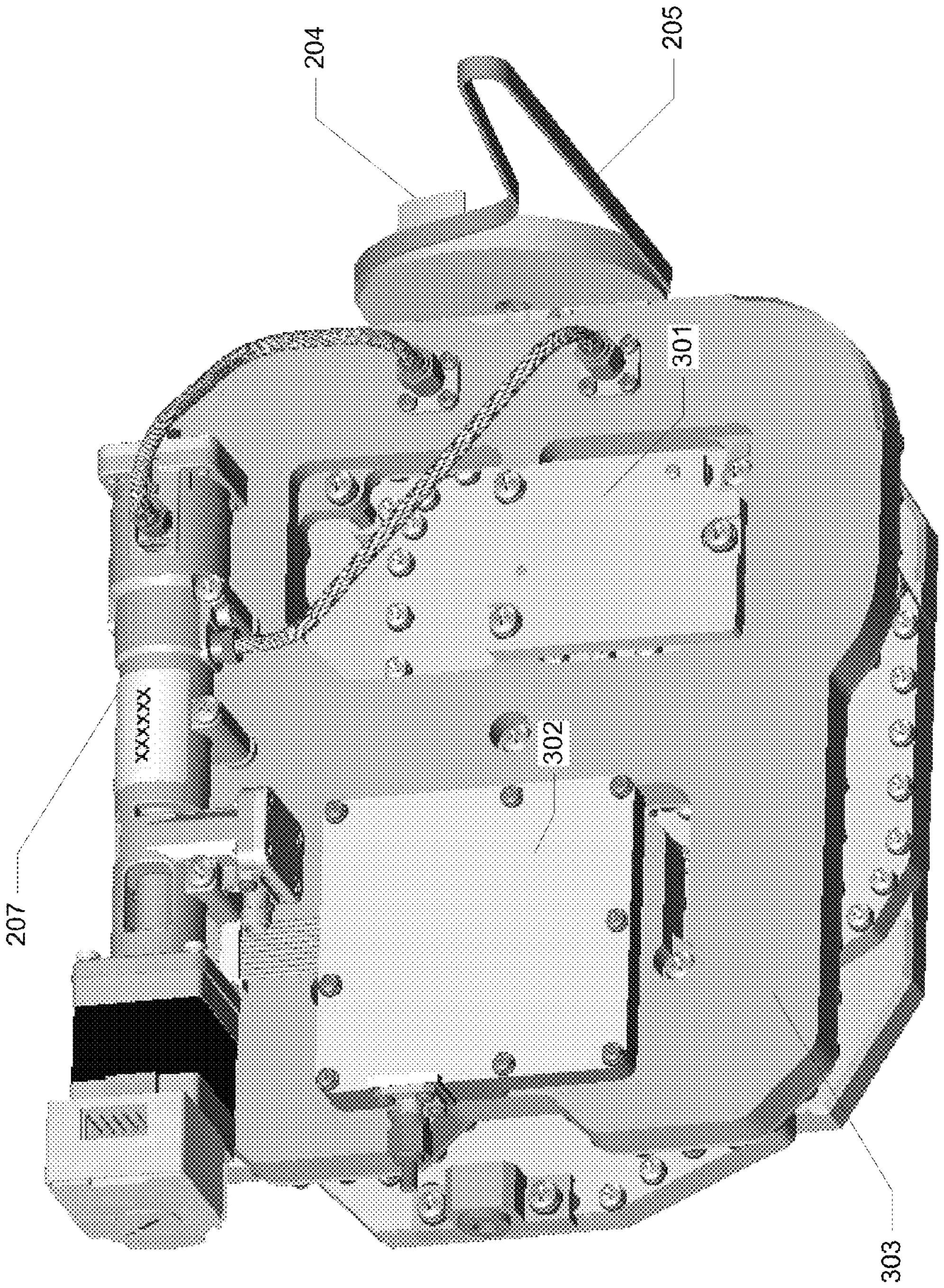

FIGS. 3*a* & *b* illustrate isolation views of the front and rear of an example panel 200. In the rear view, a gyroscope circuit 301, RF combiner 302, and diplexer circuitry 303 can be seen.

Figure 4:
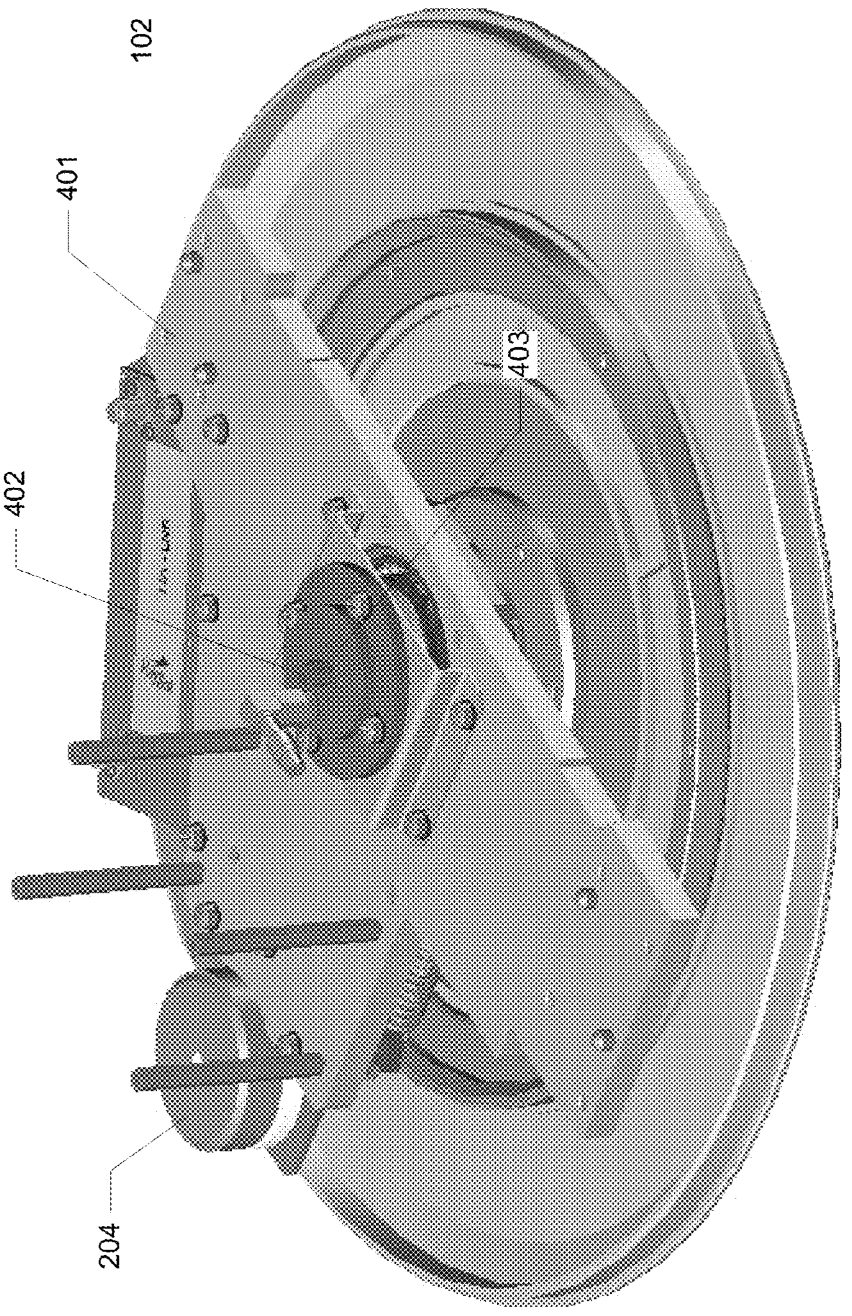
FIG. 4 illustrates a closer view of a rotatable assembly.

FIG. 4 illustrates a closer view of the rotating assembly 102. The rotating assembly 102 may include a rotating platform 401 configured to rotate about a central axis 402 under the control of an azimuth motor 204 and its corresponding belt and pulley. The antenna array panel 200 may be mounted to the rotating assembly. A dual channel rotary joint 403 may be used to allow wiring and/or signals from above the rotating platform to pass through the bottom cover and reach components located under the rotating assembly 102, such as the BUC 103.

Figure 5:
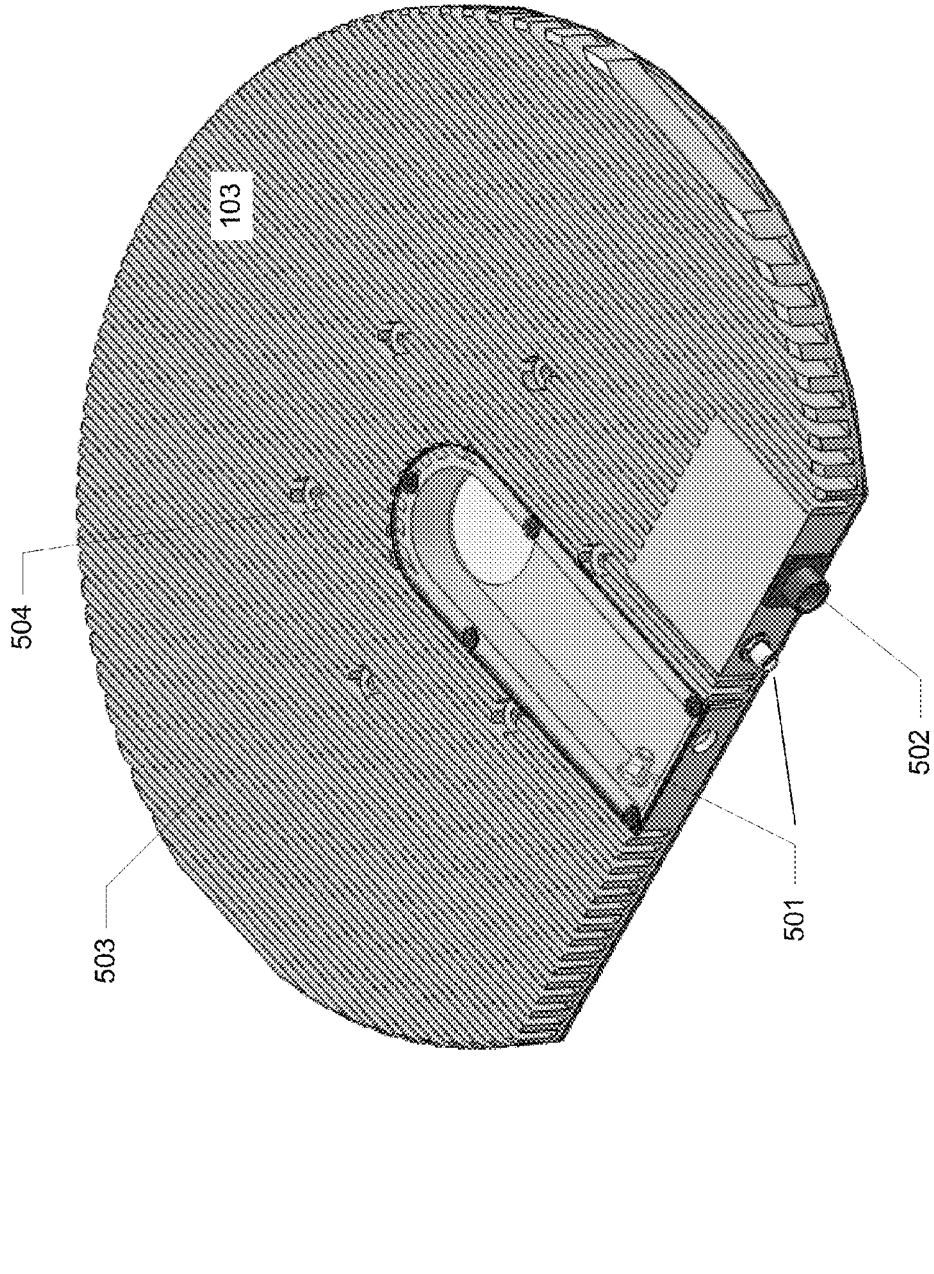
FIG. 5 illustrates a closer view of a block upconverter.

FIG. 5 illustrates a closer view of the BUC 103. The BUC 103 can be configured to upconvert signals to higher frequency bands and amplifying them for transmission, such as converting L band to Ku band. It can be shaped to fit under the radome 101, and can have a thin profile (e.g., 2 cm). The BUC 103 may include input and output connectors 501, to carry signals from and to the panel 200, DC power input 502, cooling fins 503 and various mounting holes 504 to allow it to be mounted to the underside of the rotating assembly 102.

Figure 6:
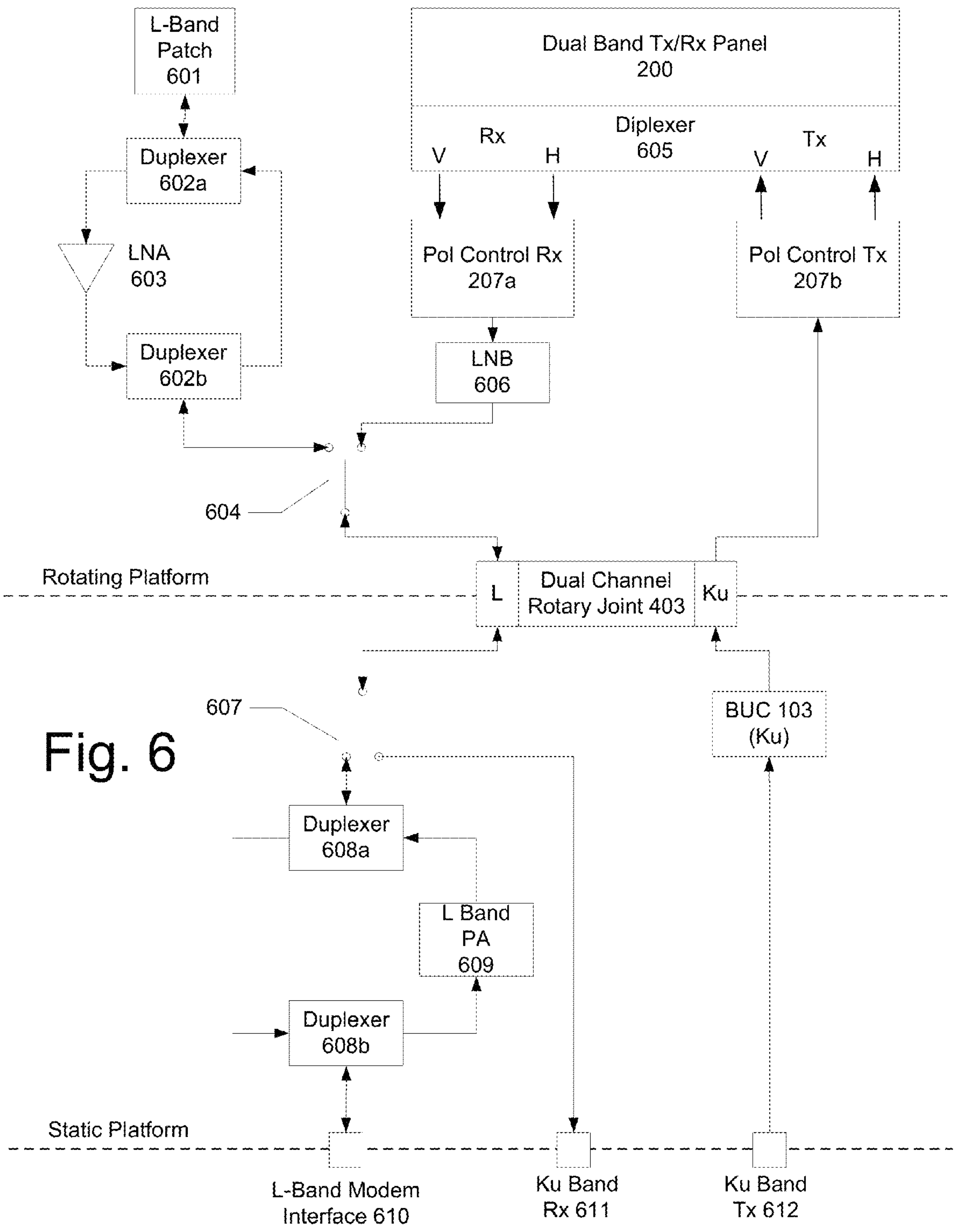
FIG. 6 is a block diagram illustrating components of an antenna assembly.

FIG. 6 illustrates a block diagram representation of the example assembly shown in FIGS. 1-5. Element numerals are repeated for common elements. Additional elements are shown as well. For example, the L-band patch 601 may be a printed circuit antenna element of the L-band antenna 201, and can be used for transmission and reception on the L-band (or any other desired low frequency band). A series of duplexers 602*a* & *b* (which can be diplexers configured for signaling) can be used to isolate the up and down frequencies for the two-way transmission (which can be simultaneously carried out), while a low noise amplifier 603 can be used to amplify the received signal for further processing. This L-band portion (the top left portion of FIG. 6) can be connected to a source selection switch 604. The source selection switch 604 can be a manually or electronically controlled switch, and can selectively connect the L-band portion to the rest of the antenna and, ultimately, to user devices to allow those devices to receive L-band signals. If manual, the switch 604 can be positioned anywhere on the antenna, such as on an outer surface of the control circuit 202.

The other side of the source selection switch 604 can be connected to reception circuitry for the panel 200, which in some examples can be a Ku or Ka band panel. The panel 200 may include a diplexer 605 for separating transmission and reception frequencies. The reception side of the diplexer 605 may be connected to a receive side 207*a* of polarization control circuit 207 and then to low noise block (LNB) 606, which can process received signals to supply them to the receive selection switch 604.

The diplexer 605 may also include a transmission side connected to a transmission side 207*b* of the polarization control 207.

A dual channel rotary joint 403 may have an L-band side and a Ku-band side connected to the switch 604 and transmit polarization control 207, respectively (left and right in FIG. 6). The dual channel rotary joint 403 allows the wiring for these signals to pass through the rotating platform to other components in the system, such as interfaces to modems. On the left, the L-band side may connect to another switch 607. Similar to the switch 604, switch 607 also selectively switches between the L-band interface 610 and Ku-band (in this example) reception interface 611. On the right hand side, a Ku-band transmission interface 612 may receive signals to be transmitted in the Ku-band, and the BUC 103 may upconvert those signals for transmission by the panel 200.

Figure 7:
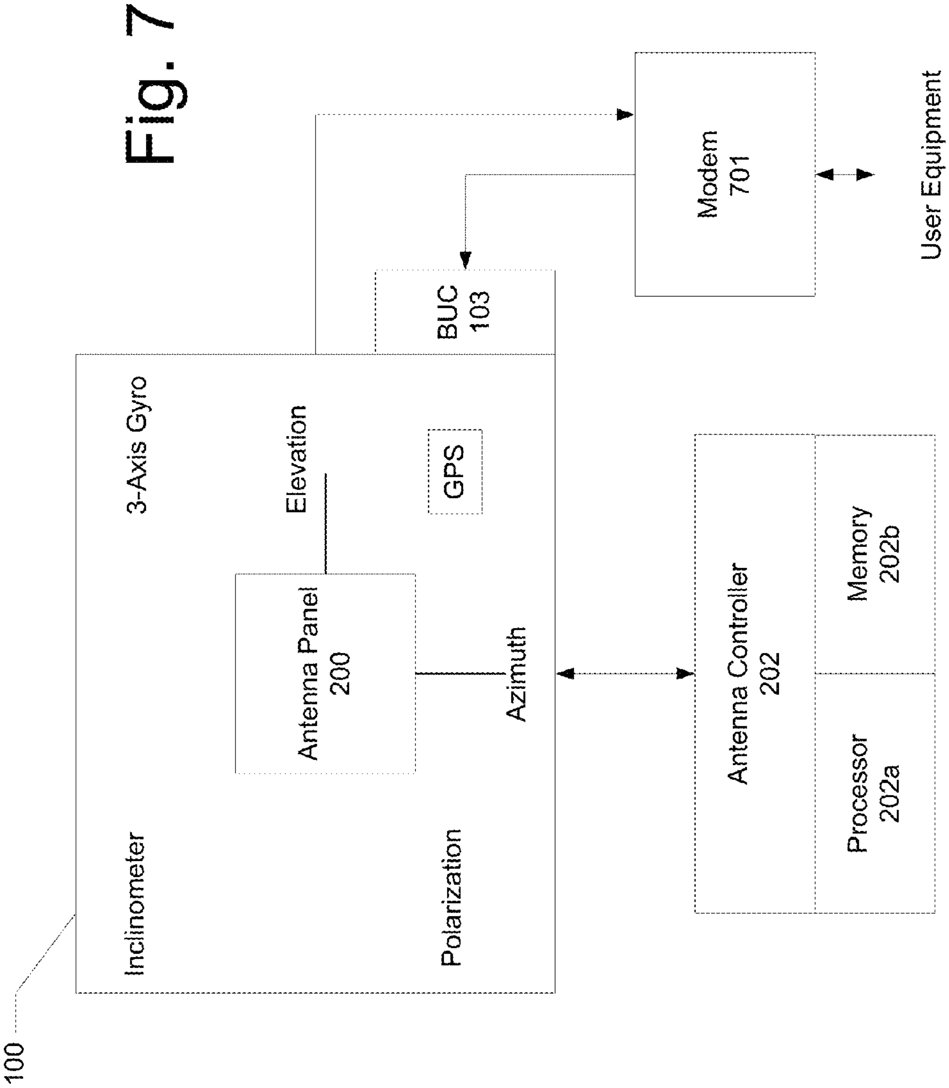
FIG. 7 is a block diagram illustrating tracking components of an antenna assembly.
Figure 8:
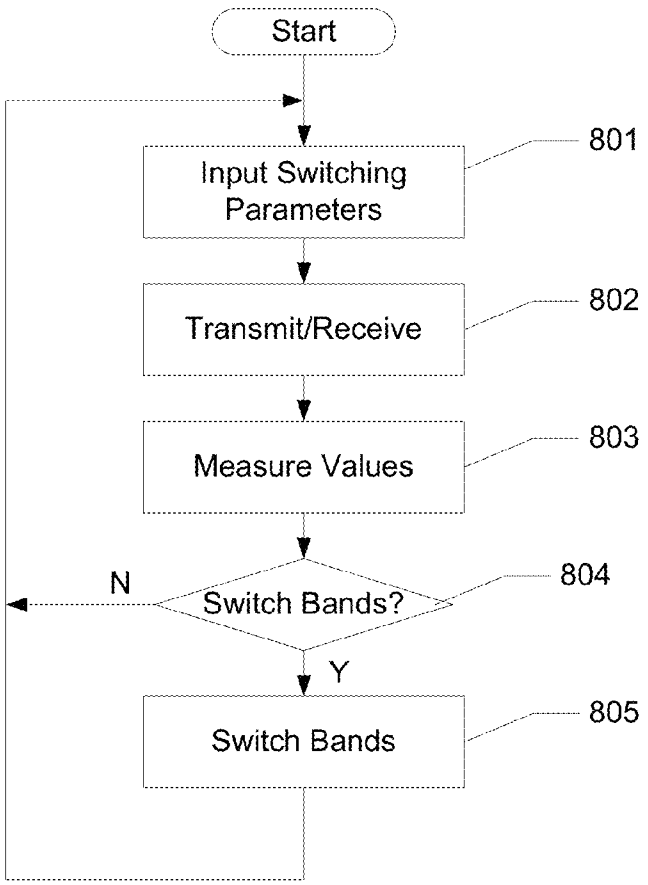
FIG. 8 illustrates an example process for providing parameters and switching between bands of operation.

FIG. 7 illustrates an example block configuration for using the antenna components described above. Beginning at the bottom, various pieces of user equipment (e.g., computers) may connect to a modem 701, which in turn can be connected to the BUC 103 for higher band (e.g., Ku-band) transmissions, and to the antenna assembly 100 directly for other communications. The controller 202 may control the operation of the antenna through the execution by a processor 202*a* of instructions stored in a memory 202*b*, and antenna panel 200 may receive controls for azimuth, elevation and polarization adjustments to track a satellite. Inputs from an inclinometer, gyroscope and GPS may also be used for this tracking FIG. 8 illustrates an example process for using the antenna system described above. The process can be carried out by the antenna's control circuit 202 and its processor(s). In step 801, the antenna system may initially receive switching parameters. It may do this by, for example, receiving user input from a computer connected to the antenna's controller board 202 using any of the interfaces discussed above (e.g., via an Ethernet interface). The controller circuit 202 may support an IP-based interface, allowing user computers to view and modify user settings and parameters.

The user may, for example, view a user interface identifying various parameters that can be adjusted and/or weighted for switching between the bands supported by the antenna for the desired one- or two-way communication. For example, if the antenna supported L-band, Ka-band and terrestrial cellular, the parameters may identify signal conditions and priorities in which each is to be used. For example, the parameter can indicate that L-band is given first priority, cellular terrestrial is next, and Ka-band is last, due to relative costs of using each band for communication. The parameter can also specify minimum signal strength values or signal-to-noise ratios in which each band is acceptable.

The parameters can indicate that the priorities can be different in different geographic locations. For example, if terrestrial cellular is extremely expensive in some regions of the world, the priority for cellular may be moved to be last, with Ka-band moving up.

The parameters can indicate that the priorities can be different at different times of day. The parameters may indicate a security level of different bands and/or geographic locations. For example, the user may know that certain bands (or services on bands) have stronger encryption than other services or bands, and those security levels can alter the priority of the available bands. The parameters may also be adjusted based on known jamming capability of enemy forces. For example, if it is known that enemy forces in a given geographic area are actively jamming in the L-band, then the priority for that area can lower the priority of the L-band. The look angle to a particular satellite may also be a parameter. For example, a satellite that is lower in the horizon is more likely to suffer eventual interference, even if the current signal is strong, so the user may choose to indicate that satellites having a more vertical look angle should be given higher priority. The look angle can be based on the GPS position and the particular locations of the satellites that offer the different bands.

Another parameter may be based on available bandwidth in each band. For example, different bands may be more congested than other bands, and can consequently offer different amounts of available bandwidth. The parameters may indicate that a certain minimum amount of bandwidth must be available for a particular band to be used, and if the available bandwidth in that band falls below the minimum amount, then the band may be switched for a different band. The same is true for different services within the same band (e.g., two competitors that offer communication service in the L-band).

Another parameter may be the application being used, or data type being sent. For example, if the customer device only needs to send a small amount of data, such as a text message, then a lower-bandwidth link such as some found in the L-band may be more appropriate. Similarly, if the customer device needs to send a large amount of data, such as a multimedia streaming video, then a higher-bandwidth band like Ku, Ka or X may be more appropriate. Based on the desired data to be sent, the priorities for the different bands can be altered.

From the above, it should be clear that the various user parameters can be modified and combined in any desired manner, to result in any desired user profile of prioritizing bands. When the user is finished editing the parameters, the various parameters may be stored in the controller's memory, and the process can proceed to step 802.

In step 802, the antenna system (or the controller) can proceed with conducting transmission and reception for the various connected devices (e.g., consumer devices or modems 701 that request to receive or transmit information). In some embodiments, the operation of the system can be completely autonomous, once the parameters are established.

In step 803, which can occur continuously and/or simultaneously with step 802, the antenna system can measure values that affect the parameters set in step 801. For example, the system can measure signal strengths and signal-to-noise ratios for the various bands. It can also determine the antenna's current location using the GPS component.

In step 804, the system can determine whether the measured values should result in a change of the band. For example, if the signal-to-noise ratio for the L-band falls below its floor threshold, the antenna controller may consult the user's parameters and determine that it should now switch from the L-band to the next priority band (e.g., Ka-band). If no switch is needed, the process can return to step 801 (which can be skipped if no new parameters are needed, e.g. if the user has not requested to change a parameter). If a switch is needed, the process may proceed to step 805.

In step 805, the antenna may switch to the new band. This may be done, for example, by automatically changing the switch 604 and switch 607, and requesting that the modem 701 use a different interface (610/611/612) for the communications to and from the consumer or user devices.

From there, the process can return to step 801, and can repeat indefinitely.

The antenna can have active control of the azimuth, elevation and polarization angles to maintain precise pointing towards the target satellite. The antenna can scan mechanically in both azimuth and elevation.

During operation with a geostationary satellite, the antenna can use a built-in GPS receiver to determine its position on the earth. It can then use the geographical position and the stored (e.g., in local memory) orbital location of the target satellite to determine the appropriate elevation angle. Once the elevation angle is set, the antenna can rotate in azimuth. During the scanning process the antenna can receive Eb/No information (e.g., signal to noise) from the modem to verify that the target satellite has been acquired. Once the satellite is acquired, the antenna can dither in both azimuth and elevation by ±2.0° to maintain peaking on the satellite and the transmission is enabled. The antenna may also include internal 3-axis gyroscopes and 2-axis inclinometers to help with the tracking while the antenna is in motion. The antenna can use the information from the gyros to determine when the pointing offset has reached 2.0° and can initiate transmit muting when this occurs within 100 milliseconds. In alternative embodiments, electronic beam steering can be used by the controller after the satellite is acquired to maintain peaking on the satellite while the system is in motion.

Although example embodiments are described above, the various features and steps may be combined, divided, omitted, and/or augmented in any desired manner, depending on the specific secure process desired. For example, the antenna system can include circuitry to support multiple different bands beyond the examples described. It can also support different services in the same band. For example, if two different competitors offer L-band communication services, the antenna system can switch between the two based on the parameters, and can switch to track a different satellite but in the same band.

We claim:

1. An antenna system, comprising:

a low-volume enclosure;

a motor-driven rotatable assembly within the enclosure;

a flat panel array antenna mounted on the rotatable assembly within the enclosure and configured to communicate in a first satellite frequency band;

a secondary antenna within the enclosure and mounted on the rotatable assembly, configured to communicate in a second satellite frequency band different from the first;

a processor, configured to automatically switch between the first and second bands for two-way satellite communication in each band; and a dual-channel rotary joint connecting a block upconverter unit to the motor-driven rotatable assembly, wherein the block upconverter unit is configured to be a stationary mount, while the rotating assembly is configured to rotate with respect to the block upconverter unit.

2. The system of claim 1, wherein the processor is configured to automatically switch between the first and second bands based on user-entered parameters.

3. The system of claim 1, wherein the processor is configured to automatically switch between the first and second bands based on signal strength requirements and a predefined priority between the bands.

4. The system of claim 2, wherein the parameters identify different priorities for different geographic locations.

5. The system of claim 2, wherein the parameters identify different priorities for different times of day.

6. The system of claim 2, wherein the parameters identify different priorities for different satellite look angles.

7. The system of claim 2, wherein the parameters identify different priorities for different amounts of available bandwidth on the first and second bands.

8. The system of claim 1, further comprising a third antenna, configured to communicate in a terrestrial wireless frequency band.

9. The system of claim 8, wherein the terrestrial wireless frequency band is a cellular telephone frequency.

10. The system of claim 1, wherein the processor is further configured to autonomously acquire and track a satellite while the antenna system is in motion.

11. The system of claim 2, wherein the parameters identify different priorities for different bandwidth costs on the first and second bands.

12. An antenna system, comprising:

a block upconverter unit;

a low-volume enclosure mounted on the block upconverter unit;

a rotating assembly mounted on the block upconverter unit and within the enclosure;

two flat panel antennas within the enclosure, wherein the antennas are configured to communicate with satellites in different frequency bands;

a processor, configured to use the antennas to track and communicate with satellites in the different frequency bands, and to automatically switch between the different frequency bands; and a dual-channel rotary joint connecting the block upconverter unit to the rotating assembly, wherein the block upconverter unit is configured to be a stationary mount, while the rotating assembly is configured to rotate with respect to the block upconverter unit.

13. The system of claim 12, wherein the processor is further configured to switch between the different frequency bands based on data transmission need characteristics of a device communicatively coupled to the system, and on respective bandwidth availability of the different bands.

14. The system of claim 12, wherein the processor is further configured to switch between the different frequency bands based on data transmission need characteristics of a device communicatively coupled to the system, and on bandwidth cost parameters for the different bands.

15. The system of claim 12, wherein the processor is further configured to switch between the different frequency bands based on satellite look angles for satellites using the different frequency bands.

16. The system of claim 12, further comprising a third antenna mounted on the rotating assembly and within the enclosure, and configured to communicate using terrestrial cellular telephone communications.

17. The system of claim 12, further comprising:

a global positioning system (GPS), wherein the processor is further configured to use the GPS to determine which panel and frequency will be used to service a user device communicatively connected to the system.

18. The system of claim 12, wherein the low-volume enclosure has a cylindrical shape with a diameter of less than thirteen inches and a height of less than ten inches.

19. The system of claim 12, wherein one of the antennas is a Ku or Ka band antenna mounted on an elevation mount, while the other one of the antennas is an L-band antenna that is mounted without an elevation mount.

* * * * *